(12) United States Patent
Kachare et al.

(10) Patent No.: US 12,265,862 B2
(45) Date of Patent: *Apr. 1, 2025

(54) SYSTEM AND METHOD FOR OFFLOADING APPLICATION FUNCTIONS TO A DEVICE

(71) Applicant: Samsung Electronics Co., Ltd., Suwon-si (KR)

(72) Inventors: Ramdas P. Kachare, Pleasanton, CA (US); Stephen G. Fischer, San Jose, CA (US); Oscar P. Pinto, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 10 days.

This patent is subject to a terminal disclaimer.

(21) Appl. No.: 17/552,276

(22) Filed: Dec. 15, 2021

(65) Prior Publication Data

US 2022/0107857 A1    Apr. 7, 2022

Related U.S. Application Data

(63) Continuation of application No. 16/543,264, filed on Aug. 16, 2019, now Pat. No. 11,204,819.

(Continued)

(51) Int. Cl.
*G06F 9/54*     (2006.01)
*G06F 9/30*     (2018.01)
(Continued)

(52) U.S. Cl.
CPC .......... *G06F 9/545* (2013.01); *G06F 9/30134* (2013.01); *G06F 9/3802* (2013.01); *G06F 9/44594* (2013.01); *G06F 9/4806* (2013.01)

(58) Field of Classification Search
CPC .... G06F 9/545; G06F 9/30134; G06F 9/3802; G06F 9/44594; G06F 9/4806;
(Continued)

(56) References Cited

U.S. PATENT DOCUMENTS 6,715,011 B1 *  3/2004  Buckland .............. G06F 11/349
                                              714/E11.201
7,660,933 B2    2/2010  Wang
(Continued)

FOREIGN PATENT DOCUMENTS

CN      104425041 A    3/2015
CN      106557344 A    4/2017
(Continued)

OTHER PUBLICATIONS

Abdessalem, "Automatic Kernel Selection for Gaussian Processes Regression with Approximate Bayesian Computation and Sequential Monte Carlo", pp. 1-13, Aug. 2017. (Year: 2017).*

(Continued)

*Primary Examiner* — Kevin L Young
*Assistant Examiner* — Phuong N Hoang
(74) *Attorney, Agent, or Firm* — Lewis Roca Rothgerber Christie LLP (57) ABSTRACT

A system includes a host device; a storage device including an embedded processor; and a bridge kernel device including a bridge kernel hardware and a bridge kernel firmware, wherein the bridge kernel device is configured to receive a plurality of arguments from the host device and transfer the plurality of arguments to the embedded processor for data processing.

20 Claims, 8 Drawing Sheets

Related U.S. Application Data (60) Provisional application No. 62/784,275, filed on Dec. 21, 2018.

(51) Int. Cl.
*G06F 9/38* (2018.01)
*G06F 9/445* (2018.01)
*G06F 9/48* (2006.01)

(58) Field of Classification Search
CPC .... G06F 9/547; G06F 9/5027; G06F 9/30098; G06F 9/5016; G06F 13/4027; G06F 2213/0026
See application file for complete search history.

(56) References Cited

U.S. PATENT DOCUMENTS

| | | |
|---|---|---|
| 8,504,781 B2 | 8/2013 | Ido |
| 8,549,345 B1 | 10/2013 | Tripathi et al. |
| 8,848,741 B2 | 9/2014 | Cook et al. |
| 9,411,700 B2 | 8/2016 | Lee |
| 9,632,831 B2 | 4/2017 | Lee et al. |
| 10,031,736 B2 | 7/2018 | Lin |
| 10,075,524 B1* | 9/2018 | Bshara .................... H04L 69/08 |
| 10,423,331 B2 | 9/2019 | Choi et al. |
| 10,445,271 B2 | 10/2019 | Wang et al. |
| 2004/0003126 A1* | 1/2004 | Boucher ............... H04L 45/745 719/321 |
| 2004/0123287 A1 | 6/2004 | Fox et al. |
| 2005/0223145 A1 | 10/2005 | Lin et al. |
| 2005/0278459 A1* | 12/2005 | Boucher ............... H04L 47/193 709/250 |
| 2006/0143506 A1 | 6/2006 | Whitt et al. |
| 2007/0043804 A1 | 2/2007 | Fibaek |
| 2007/0245409 A1 | 10/2007 | Harris et al. |
| 2008/0071972 A1 | 3/2008 | Kimura |
| 2008/0140883 A1 | 6/2008 | Salessi et al. |
| 2008/0140932 A1 | 6/2008 | Flynn et al. |
| 2008/0216150 A1* | 9/2008 | Brabson ............. H04L 63/0823 726/1 |
| 2008/0283059 A1 | 11/2008 | Siegel et al. |
| 2011/0283059 A1 | 11/2011 | Govindarajan et al. |
| 2012/0331278 A1 | 12/2012 | Breternitz et al. |
| 2013/0290618 A1 | 10/2013 | Werner et al. |
| 2014/0149692 A1 | 5/2014 | Kim et al. |
| 2014/0198652 A1 | 7/2014 | Dalal et al. |
| 2014/0281151 A1 | 9/2014 | Yu et al. |
| 2015/0052280 A1* | 2/2015 | Lawson .................. G06F 13/28 710/308 |
| 2015/0324441 A1 | 11/2015 | Zhou |
| 2016/0080284 A1* | 3/2016 | Jeon .......................... G06F 9/50 709/226 |
| 2016/0293274 A1 | 10/2016 | Schuh et al. |
| 2016/0335120 A1 | 11/2016 | Gupta et al. |
| 2017/0046152 A1 | 2/2017 | Shih et al. |
| 2017/0262567 A1 | 9/2017 | Vassiliev |
| 2018/0115496 A1 | 4/2018 | Eckert et al. |
| 2018/0321859 A1* | 11/2018 | Jung ....................... G06F 13/16 |
| 2019/0042501 A1 | 2/2019 | Trika |
| 2019/0050325 A1 | 2/2019 | Malladi et al. |
| 2019/0095229 A1* | 3/2019 | Guo ....................... G06F 9/4552 |
| 2019/0107956 A1 | 4/2019 | Kachare et al. |
| 2019/0188032 A1* | 6/2019 | Jaloma .................. G06F 9/5038 |
| 2019/0286581 A1 | 9/2019 | Benisty et al. |
| 2020/0125395 A1* | 4/2020 | Accapadi ................ G06F 13/24 |
| 2020/0183698 A1 | 6/2020 | Hania et al. |
| 2020/0301898 A1 | 9/2020 | Samynathan et al. |
| 2022/0012088 A1* | 1/2022 | Guim Bernat ........ G06F 21/606 |

FOREIGN PATENT DOCUMENTS

| | | |
|---|---|---|
| CN | 107066404 A | 8/2017 |
| CN | 108292239 A | 7/2018 |
| JP | 2009-187313 A | 8/2009 |
| JP | 2010-97252 A | 4/2010 |
| JP | 2016-71886 A | 5/2016 |
| JP | 2017-102552 A | 6/2017 |
| KR | 2015-0025393 A | 3/2015 |
| KR | 2017-0092091 A | 8/2017 |
| TW | 200421803 A | 10/2004 |
| TW | 200534157 A | 10/2005 |
| TW | 201706836 A | 2/2017 |
| TW | 201712542 A | 4/2017 |
| WO | WO 2015/193947 A1 | 12/2015 |

OTHER PUBLICATIONS

Argyriou, "A DC-Programming Algorithm for Kernel Selection", (pp. 1-8). (Year: 2006).*
Japanese Examination Report dated Dec. 19, 2023, issued in Japanese Patent Application No. 2019-229993, 4 pages.
Japanese Notice of Allowance dated May 28, 2024, issued in Japanese Patent Application No. 2019-229993 (3 pages).
Taiwanese Office Action and Search Report for TW Application No. 11320626980 dated Jun. 21, 2024, 5 pages.
Korean Office Action for KR Application No. 10-2019-0159399 dated Aug. 7, 2024, 4 pages.

* cited by examiner

```
/*******OPEN CL BASED  HOST  FUNC_SMARTSSD  *********/

RECEIVE CALL FROM UPPER LAYER
RECEIVE CALL FROM THE UPPER LAYER,
RETRIEVE ARGUMENTS

ALLOCATE BUFFERS FOR DATA PROCESSING
PTR1=ALLOC_BUFFER (SIZE 1); //THERE CAN BE MANY DIFFERENT METHODS TO
ALLOCATE BUFFERS, BEYOND THE SCOPE
PTR2=ALLOC_BUFFER (SIZE 2);

PTRN=ALLOC_BUFFER (SIZE N);

INITIALIZE OTHER ARGUMENTS NEEDED BY THE OFFLOADED FUNCTION
VAL1=1;
VAL2=2;

VALN=N;

FETCH DATA INTO THE BUFFERS FOR PROCESSING
FREAD(FPTR, PTR1); //THIS EXAMPLE USES FILE IO, THERE COULD BE VARIOUS
OTHER MEANS OF LOADING DATA INTO THE BUFFERS FOR PROCESSING

INVOLK THE PROCESSING KERNEL
STATUS=BRIDGE_KERNEL (VAL1, ...VALN, PTR1, ...PTRN);

CLEAN-UP
WHILE (BRIDGE_KERNEL NOT DONE) {WAIT HERE};
RETURN TO UPPER LAYER
```

FIG. 3

| REGISTER # | REGISTER NAME | COMMENTS |
|---|---|---|
| 0 | START_KERNEL | WRITE TO THIS REGISTER TRIGGER KERNEL |
| 1 | DONE_KERNEL | SET BY THE KERNEL AFTER PROCESSING IS COMPLETE, POLLED BY HOST |
| 2 | ERROR_KERNEL | SET BY THE KERNEL IF APPROPRIATE |
| 3 | ARGUMENT-1 | ARGUMENT PASSED TO THE OFFLOADED FUNTION, READ/WRITE BY HOST/SMART SSD |
| 4 | ARGUMENT-2 | |
| | | |
| K | ARGUMENT-M | |

SYSTEM AND METHOD FOR OFFLOADING APPLICATION FUNCTIONS TO A DEVICE

CROSS-REFERENCE TO RELATED APPLICATION(S)

This application is a continuation of U.S. patent application Ser. No. 16/543,264, filed Aug. 16, 2019, which claims priority to and the benefit of U.S. Provisional Patent Application Ser. No. 62/784,275, filed Dec. 21, 2018 and entitled "S&M FOR OFFLOADING APPLICATION FUNCTIONS TO A DEVICE," the entire contents of both of which are incorporated herein by reference.

FIELD

One or more aspects of embodiments according to the present disclosure relate to a system and a method for offloading application functions to a device.

BACKGROUND

In modern information technology (IT) infrastructure, relatively large amounts of data may be generated by various devices and processes. Some examples of these data generators include smart devices (e.g., iPhone, iPad, etc.), autonomous vehicles, social networks, and internet of things (IOT) devices. Artificial intelligence (AI) and machine learning (ML) algorithms are being developed to analyze and use the collected data to achieve higher application efficiency and productivity. It may be desirable to process and analyze the data in view of the recent development of the IT infrastructure.

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to a system and a method for offloading application functions to a device. According to some example embodiments of the present disclosure, a system includes a host device; a storage device including an embedded processor; and a bridge kernel device including a bridge kernel hardware and a bridge kernel firmware, wherein the bridge kernel device is configured to receive a plurality of arguments from the host device and transfer the plurality of arguments to the embedded processor for data processing.

In some embodiments, an implementation of the bridge kernel device is transparent to the host device, wherein the bridge kernel device is agnostic to a transport mechanism between the host device and the bridge kernel device, wherein the transport mechanism is one of a peripheral component interconnect express (PCIe) or an Ethernet connection. In some embodiments, the storage device is a solid state drive (SSD), and the embedded processor is a field programmable gate array (FPGA) processor or a SSD controller or a discrete co-processor, wherein: the embedded processor includes offloaded application functions configured to be executed on the embedded processor, the embedded processor further includes the bridge kernel firmware, the bridge kernel device transfers the plurality of arguments received from the host device to the offloaded application functions, and the bridge kernel device fetches the plurality of arguments received from a host register interface of the host device.

In some embodiments, the storage device further includes a first in, first out (FIFO) register and a dynamic random-access memory (DRAM), the DRAM including a plurality of data buffers and a handshake region to store the plurality of arguments received from the host device, and wherein the FIFO register and the DRAM are communicatively coupled to the bridge kernel hardware. In some embodiments, the FIFO register is configured to pass the plurality of arguments to the embedded processor incorporating the offloaded application functions for data processing. In some embodiments, the bridge kernel hardware is configured to temporarily store the plurality of arguments received from the host device into the handshake region of the DRAM. In some embodiments, the bridge kernel device is configured to act as a proxy to host applications running on a customer applications module of the host device, wherein the host applications are agnostic to where or how the offloaded application functions are implemented.

In some embodiments, the host device includes a customer applications module and an open computing language (OpenCL) module, and wherein the host device is configured to establish a peripheral component interconnect express (PCIe) or an Ethernet connection with the storage device. In some embodiments, the bridge kernel hardware includes a plurality of hardware kernels and the bridge kernel firmware includes a plurality of software kernels, the plurality of software kernels configured to run on the embedded processor, wherein host applications running on the customer applications module of the host device are configured to interface with the plurality of software kernels and/or hardware kernels through the OpenCL module. In some embodiments, the bridge kernel device is configured to select one or more kernels from among the plurality of hardware kernels and the plurality of software kernels for data processing based on a cost function.

In some embodiments, the bridge kernel device is configured to select the one or more kernels for data processing based on the cost function using the plurality of arguments and storage or networking parameters received from the host device, wherein the storage or networking parameters received from the host device include at least one of a Submission Queue Identifier (SQID), a Completion Queue Identifier (CQID), a Stream ID, a host ID, a Logical Block Address (LBA) range, a Network Service ID (NSID), a Media Access Control (MAC) ID, Transmission Control Protocol (TCP)/Internet Protocol (IP) fields, an application type, an application identifier, or a time and a date associated with the host device. In some embodiments, the bridge kernel device is configured to select one or more kernels from among the plurality of hardware kernels and the plurality of software kernels for data processing using the FIFO register. In some embodiments, the bridge kernel firmware is configured to fetch the plurality of arguments in the handshake region of the DRAM and call the offloaded application functions with the plurality of arguments received from the host device. In some embodiments, the offloaded application functions are configured to use the plurality of arguments for data processing.

According to some example embodiments of the present disclosure, a method includes receiving, by a bridge kernel device in a storage device, a trigger from a host device connected a the storage device; fetching, by the bridge kernel device, a plurality of arguments received from the host device, wherein the bridge kernel device is configured to fetch the plurality of arguments from a host register interface; storing, by the bridge kernel device, the plurality of arguments in a dynamic random-access memory (DRAM) of the storage device, wherein the plurality of arguments are stored in a handshake region of the DRAM; setting, by the bridge kernel device, a ready flag in the DRAM, wherein the ready flag is set in the handshake region of the DRAM; polling, by the bridge kernel device, a done flag in the DRAM based on the bridge kernel device determining that processing of offload functions in firmware of the bridge kernel device in an embedded processor of the storage device based on the plurality of arguments is completed, wherein the done flag is polled in the handshake region of the DRAM; and setting, by the bridge kernel device, a ready flag in the host register interface.

In some embodiments, the method further includes reading, by the bridge kernel device, error or status from the handshake region of the DRAM, based on detecting the done flag in the handshake region of the DRAM; and updating, by the bridge kernel device, an error or a status into the host register interface. In some embodiments, the method further includes polling, by the firmware of the bridge kernel device, the ready flag in the DRAM; fetching, by the firmware of the bridge kernel device, a plurality of arguments in a handshake region of the DRAM; calling, by the firmware of the bridge kernel device, offloaded application functions in the embedded processor of the storage device with the plurality of arguments for data processing; returning the call, by the offloaded application function, to the firmware of the bridge kernel device based on completion of the data processing; and setting, by the firmware of the bridge kernel device, a done flag in the handshake region of the DRAM.

According to some example embodiments of the present disclosure, a system includes a storage device including an embedded processor; and a bridge kernel device configured to receive a plurality of arguments from a host device and transfer the plurality of arguments to the embedded processor for data processing. In some embodiments, the bridge kernel device includes a bridge kernel hardware and a bridge kernel firmware, wherein the storage device is a solid state drive (SSD), and the embedded processor is a field programmable gate array (FPGA) processor or a SSD controller or a discrete co-processor, wherein the embedded processor includes offloaded application functions configured to be executed on the embedded processor, the embedded processor further includes the bridge kernel firmware, and wherein the bridge kernel device transfers the plurality of arguments received from the host device to the offloaded application functions that are configured to be executed on the embedded processor, wherein the bridge kernel device fetches the plurality of arguments received from the host device from a host register interface.

In some embodiments, the storage device further includes a first in first out (FIFO) register, and a dynamic random-access memory (DRAM), wherein the DRAM further includes plurality of data buffers and a handshake region, wherein the FIFO register and the DRAM are communicatively coupled to the bridge kernel hardware, wherein the bridge kernel hardware includes a plurality of hardware kernels and the bridge kernel firmware includes a plurality of software kernels, the plurality of software kernels are configured to run in the embedded processor, wherein the bridge kernel device is configured to select one or more kernels from among the plurality of hardware kernels and the plurality of software kernels for data processing based on a cost function using the plurality of arguments and storage or networking parameters received from the host device, wherein the storage or networking parameters received from the host device are one or more of a Submission Queue Identifier (SQID), a Completion Queue Identifier (CQID), a Stream ID, a host ID, a Logical Block Address (LBA) range, a Network Service ID (NSID), a Media Access Control (MAC) ID, Transmission Control Protocol (TCP)/Internet Protocol (IP) fields, an application type, an application identifier, or a time and a date associated with the host device, and wherein the bridge kernel device is configured to select the one or more kernels from among the plurality of hardware kernels and the plurality of software kernels for data processing using the FIFO register.

BRIEF DESCRIPTION OF THE DRAWINGS

These and other features of some example embodiments of the present disclosure will be appreciated and understood with reference to the specification, claims, and appended drawings, wherein:

DETAILED DESCRIPTION

The detailed description set forth below in connection with the appended drawings is intended as a description of some example embodiments of a system and a method for offloading application functions to a device provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In modern information technology (IT) infrastructure, relatively large amounts of data may be generated by various devices and processes. Some examples of these data generators include smart devices (e.g., iPhone, iPad, etc.), autonomous vehicles, social networks, and internet of things (TOT) devices. Artificial intelligence (AI) and machine learning (ML) algorithms are being developed to analyze and use the collected data to achieve higher application efficiency and productivity. It may be desirable to process and analyze the data in view of the recent development of the IT infrastructure.

In some system architectures, the data may be fetched from the persistent storage to relatively high-performance servers, which may be connected to storage using high-performance networks. Moving such large amounts of raw data to a central processing unit (CPU) for processing and analysis may be expensive in terms of amount of energy consumed, and computing and network resources deployed. Such movement of large amounts of raw data can increase the burden on resources such as network bandwidth, CPU cycles, and CPU memory. Moving large amounts of raw data to servers for processing may also increase the latency experienced by the applications running on the servers.

In some situations, applications may need to wait for data to be fetched to the servers first before processing is done and decisions are made. These added resource requirements may result in high capital expenditure and operational expenditure spending. Hence, processing raw data within the storage device (e.g., solid state drives (SSD)), as much as possible, may represent a cost-effective solution for many data analysis use cases (e.g., use cases that are directed the monetization of the growing amount of raw data). Additionally, by reducing data movements, the response latency for systems running the applications can be improved.

Moreover, systems employing data analytics tasks may often read a relatively large amount of data, process it, and reduce it through filtering and other data reduction operations. These and many other similar tasks can be implemented with SSD-based services, as these tasks may take advantage of the higher available bandwidth within the device (e.g., SSD), and preserve the limited bandwidth between the SSD and the CPU (e.g., the peripheral component interconnect express (PCIe) interface or a network fabric interface in the case of a remote direct attached storage (RDAS)) by only moving the reduced results. Hence, techniques for processing of the data closer to or inside the storage devices (e.g., SSD) are desirable for efficient and cost-effective data processing.

Some embodiments of the present disclosure include methods and systems for offloading application functions to a computational storage device (e.g., an SSD with an embedded processor), which can, in some examples, lead to efficient and cost-effective data processing solutions. A smart storage device (e.g., an SSD with an embedded processor) may provide a platform for performing at least a portion of the data processing functions that may otherwise be performed by the host CPU processor. Performing those data processing functions inside a smart SSD or a similar storage device may provide benefits in terms of energy consumption, network bandwidth, CPU cycles, memory, etc. for a storage network.

In some examples, the offloaded functions may be implemented using register-transfer level (RTL) logic, high-level synthesis (HLS), or field-programmable gate array (FPGA) logic in a storage device with embedded processor (e.g., an FPGA or a SSD controller or a discrete co-processor) to improve performance and lower power consumption of the storage network. However, the long development cycle of high performance offloaded functions using RTL or HLS may block or significantly slow down other activities of the system development. Some embodiments of the present disclosure may enable the execution of the offloaded functions on an embedded processor (e.g., in the SSD) as a software (also called firmware) function. By executing offloaded functions as software, a quick development time may be achieved. Software-based offloaded functions may also enable reuse of the software code already performing those functions on the host (e.g., host CPU).

Executing offloaded functions as software or firmware in the embedded processor of the storage device or SSD may keep the interface between the host software stack and the offloaded kernels the same with software kernels as well as with any other form of kernel implementation. Therefore, an initial, quick offload can be performed in the form of a software kernel, and at a later time, the offloaded functions can be implemented in hardware without significant changes or disruption to the overall host software stack and/or system architecture. By having a quick offload up and running, other system activities (such as, system integration, qualification, characterization, and the like) can proceed while more high-performance kernels are being developed.

As mentioned above, some embodiments of the present disclosure include a method and a system for offloading application functions to a computational storage device such as a an SSD with an embedded processor such as an FPGA or a SSD controller or a discrete co-processor, for an efficient and cost effective data processing. Some embodiments may include an FPGA hardware-based bridge kernel that can serve as a proxy to the host (e.g., a host CPU) on behalf of offloaded functions. The bridge kernel may accept the arguments from the host driver and may transfer those arguments (e.g., parameter values, memory pointers etc.) to the offloaded functions to be executed on the embedded processor (e.g., an FPGA or a SSD controller or a discrete co-processor) as software kernels. The hardware and firmware pieces in other embodiments may serve as a bridge between applications running on the host and the software kernels. Such software kernels can then be moved into hardware for high performance, at a later point, transparently to the host. Therefore, the bridge kernel host interface can be used without further modification, which may enable users of the computational storage devices (e.g., smart SSDs) to develop use cases rapidly, for example, by porting their existing application function code base to the embedded processor (e.g., an FPGA or a SSD controller or a discrete co-processor) in the storage device.

This ease of use-case development for smart SSD may permit faster user adoption of the technology described herein. High performance kernels using HLS and RTL may take a relatively large amount of development time and resources. The example embodiments of the present disclosure may enable users to perform various tasks (e.g., system integration, customer demos, system qualification, and other tasks) while high performance kernels are being developed in the background. Additionally, the bridge kernel can perform cost-based routing to different kernels. That is to say that the bridge kernel can invoke different kernels based on some function of arguments received from the host and various storage or networking parameters configured in the storage device with the embedded processor. For example, in some embodiments, based on the arguments received from the host during runtime, the bridge kernel can invoke different performance-level kernels, as appropriate.

Figure 1A:
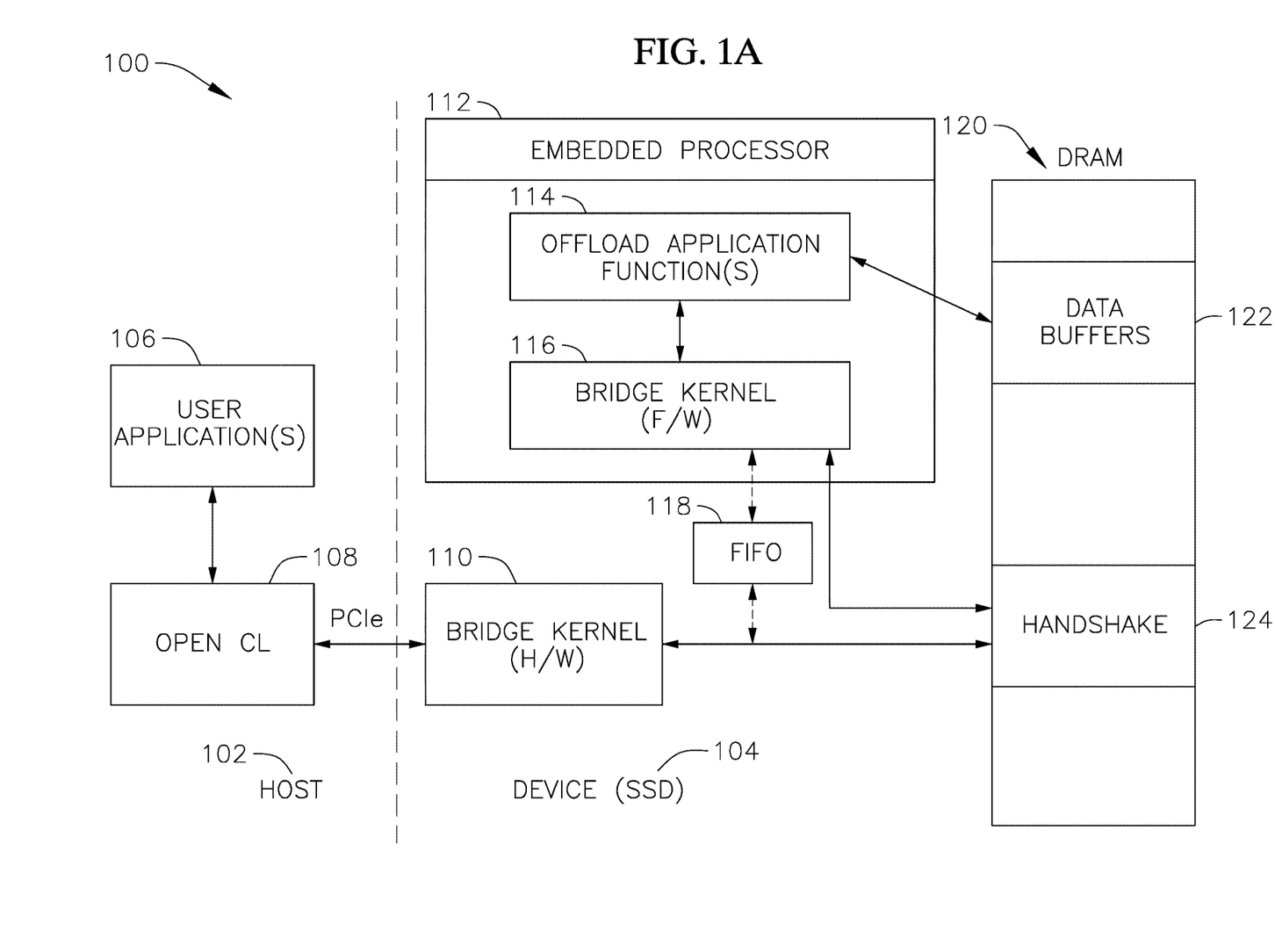
FIG. 1A illustrates an example block diagram of a system including a bridge kernel.

FIG. 1A illustrates an example block diagram of a system including a bridge kernel. System 100 includes a host 102 and a storage device 104 (e.g., a smart SSD such as a Non-Volatile Memory express (NVMe) over Fabrics (NVMe-oF)-compatible Ethernet SSD (eSSD) with a FPGA processor, or an NVMe SSD with acceleration capabilities). The host 102 includes a user application(s) 106 module and an open computing language (OpenCL) 108 module. The OpenCL 108 module may be used to represent a compute offload application programming interface (e.g., this may apply to any compute offload interface between the host 102 and the storage device 104 (e.g., SSD)). The host 102 can establish a connection with the storage device 104 using a peripheral component interconnect express (PCIe) or an Ethernet connection.

The storage device 104 includes a bridge kernel. In some embodiments, the bridge kernel may include a bridge kernel hardware 110 and a bridge kernel firmware 116. The storage device 104 further includes an embedded processor 112, a first in, first out (FIFO) 118 register, and a dynamic random-access memory (DRAM). The DRAM 120 includes data buffers 122 and a handshake region 124. The embedded processor 112 includes offloaded application function(s) 114 and the bridge kernel firmware 116.

In some embodiments, the host 102 in the system 100 may further include an operating system (OS) and a file system (FS), and an NVMe-oF driver. In some embodiments, the storage device 104 may be inside a chassis (not shown) that includes an Ethernet switch, a baseboard management controller (BMC), and a PCIe switch. The Ethernet switch provides an Ethernet connection to the storage device 104 (e.g., smart SSD) over a midplane, and the PCIe switch provides a management interface to the storage device 104 over the midplane. The BMC can program the storage device 104 according to an instruction given by a system administrator. The BMC can manage the internal components of the chassis including the Ethernet switch, the PCIe switch, and the storage device 104. The BMC can support PCIe and/or system management bus (SMBus) interfaces for the system management. The BMC can configure the storage device 104 and program the Ethernet switch. In some embodiments, the Ethernet switch provides network connectivity between the host 102 and the storage device 104.

Figure 1B:
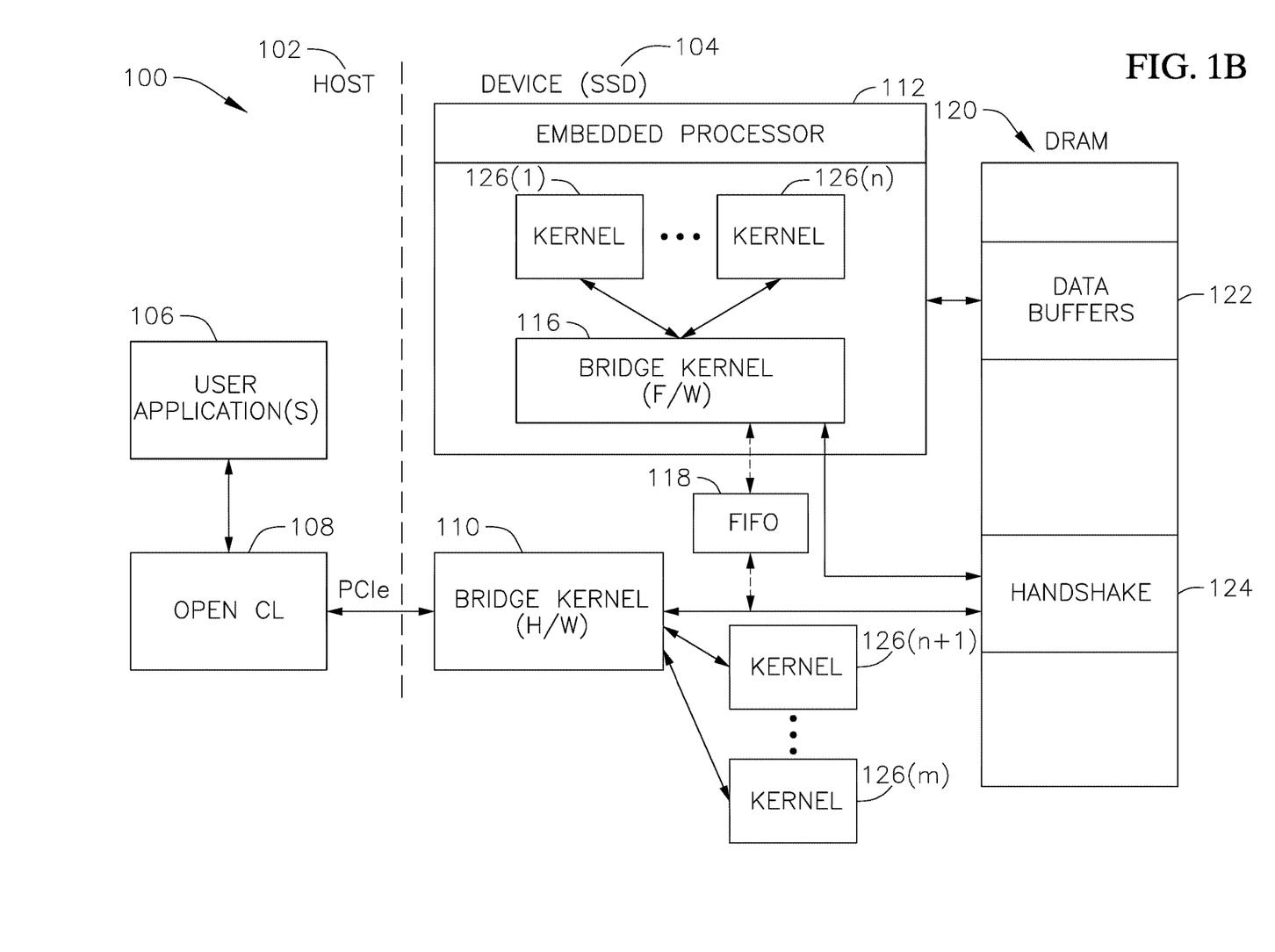
FIG. 1B illustrates a cost based routing by the bridge kernel to different kernels.

FIG. 1B illustrates a cost-based routing process, by the bridge kernel (e.g., bridge kernel hardware 110), to different kernels of the offloaded functions. In some embodiments, the system 100 enables relatively quick porting of offloaded functions (e.g., offloaded application function(s) 114) to a storage device such as smart SSD (e.g., storage device 104). In some embodiments, the user application(s) 106 running on a host (e.g., host 102) CPU may benefit from offloading some of the functions to the smart SSD (e.g., storage device 104). Usually, the functions that process lot of data stored in the SSD (e.g., storage device 104) can benefit from such offload. The offloaded functions (e.g., offloaded application function(s) 114) may be referred to as "kernels" (e.g., 126 (1), ..., 126 (n), 126 (n+1), ..., 126 (m)).

In FIG. 1B, the kernels 126 (1), ..., 126 (n) are software kernels and the kernels 126 (n+1), ..., 126 (m) are hard kernels or hardware kernels. The software kernels from among the kernels 126 (1), ..., 126 (n) may run on the embedded processor 112. The host applications (e.g., running in the user application(s) 106) can interface with the kernels (e.g., 126 (1), ..., 126 (n), 126 (n+1), ..., 126 (m)) through an interface provided by languages like OpenCL (e.g., OpenCL 108) on the host 102 side and through the bridge kernel hardware 110 on the storage device 104 side.

In some embodiments, a plurality of kernels from among the kernels 126 (1), ..., 126 (n), 126 (n+1), ..., 126 (m), can be high-performance kernels (e.g., the high-performance kernels may have performance metric above a set or predetermined threshold), and another plurality of kernels from among the kernels 126 (1), ..., 126 (n), 126 (n+1), ..., 126 (m), can be low-performance kernels (e.g., the low-performance kernels may have performance metric below a set or predetermined threshold). The bridge kernel (e.g., bridge kernel hardware 110) may perform a selection of one or more kernels from among the kernels 126 (1), ..., 126 (n), 126 (n+1), ..., 126 (m) to use for data processing.

In some embodiments, the bridge kernel can perform the selection of kernel(s) for data processing based on a cost function. In some embodiments, the cost function can be determined based on the arguments received from the host 102, and the storage or networking parameters received from the host 102. Examples of the storage or networking parameters can include, but not be limited to, Submission Queue Identifier (SQID), Completion Queue Identifier (CQID), Stream ID, host ID, Logical Block Address (LBA) range, Network Service ID (NSID), Media Access Control (MAC) ID, Transmission Control Protocol (TCP)/Internet Protocol (IP) fields, application type, application identifier, a time and/or a date associated with the host 102, combinations thereof, and/or the like.

For example, arguments can be passed to the bridge kernel from the host 102 application side (e.g., the host 102 applications may offload a cost function to the bridge kernel hardware 110). The bridge kernel may calculate the cost of using a given kernel. The bridge kernel may then select the optimal kernel based on the cost function and the combination of received storage or networking parameters from the host 102. In some embodiments, for example, the storage device 104 may implement two data compression kernels, one designed for better throughput and the other one designed for better compression ratio. For a given runtime invocation of compression from host 102, the bridge kernel may check the length argument, and may select better compression ratio kernel whenever length is greater than, for example, 64 KB and may select the other type of the compression kernel for the rest. In some embodiments, the bridge kernel hardware 110 can select optimal kernel(s) from among the kernels 126 (1), ..., 126 (n), 126 (n+1), ..., 126 (m) to use for data processing using the FIFO register.

Figure 2A:
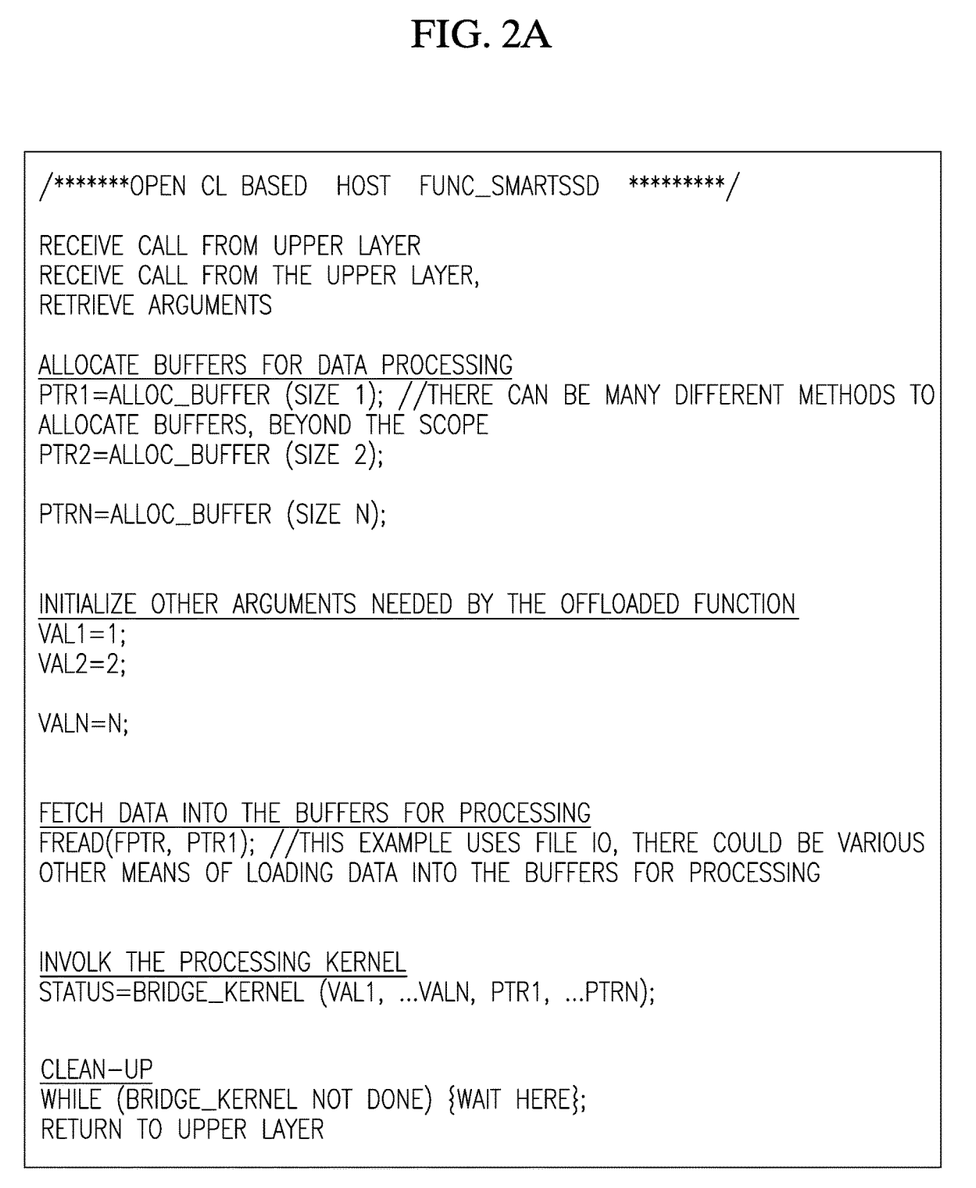
FIGS. 2A-2B illustrate example flow of host interfacing with offloaded kernels.
Figure 2B:
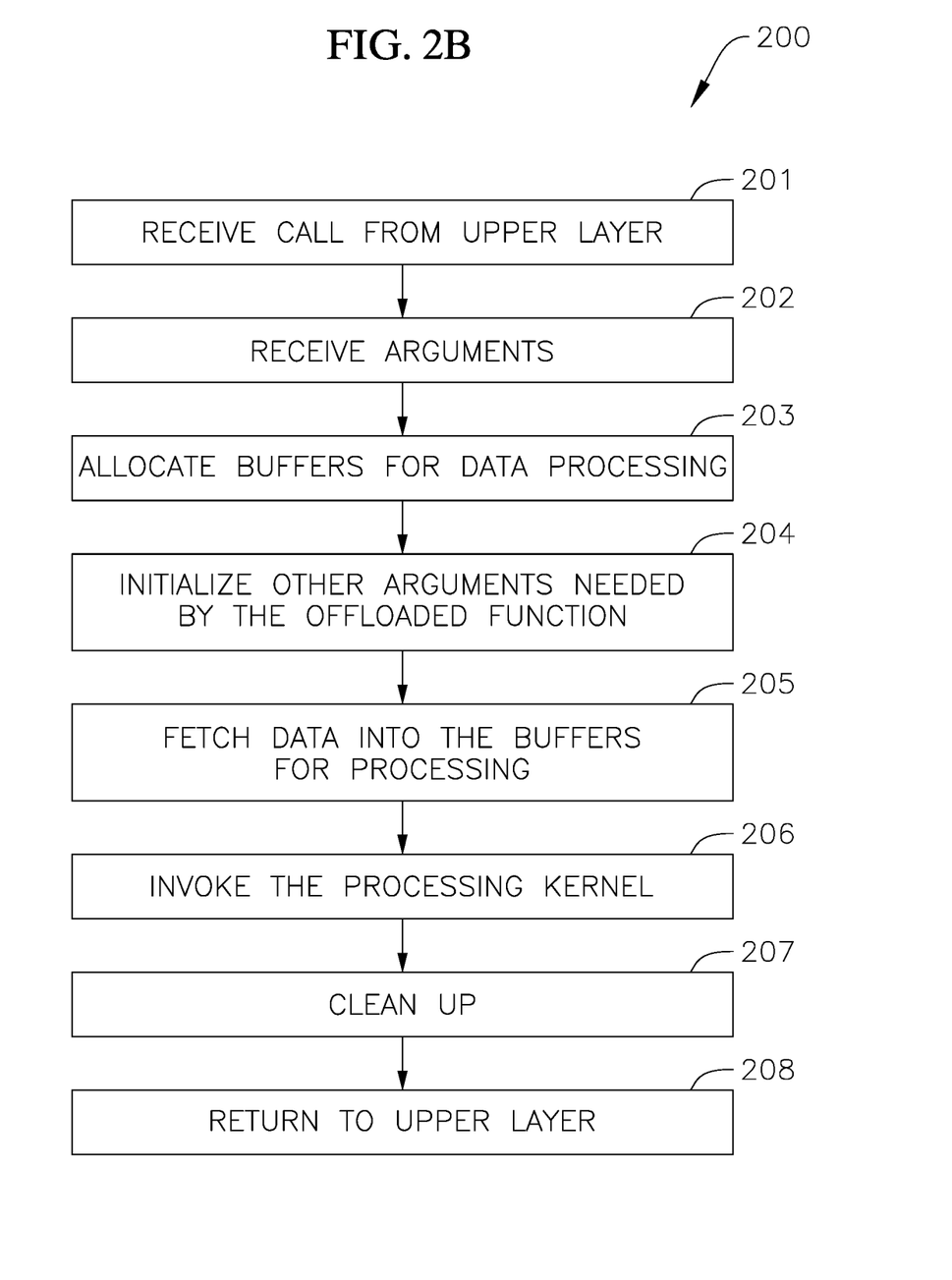
Figure 3:
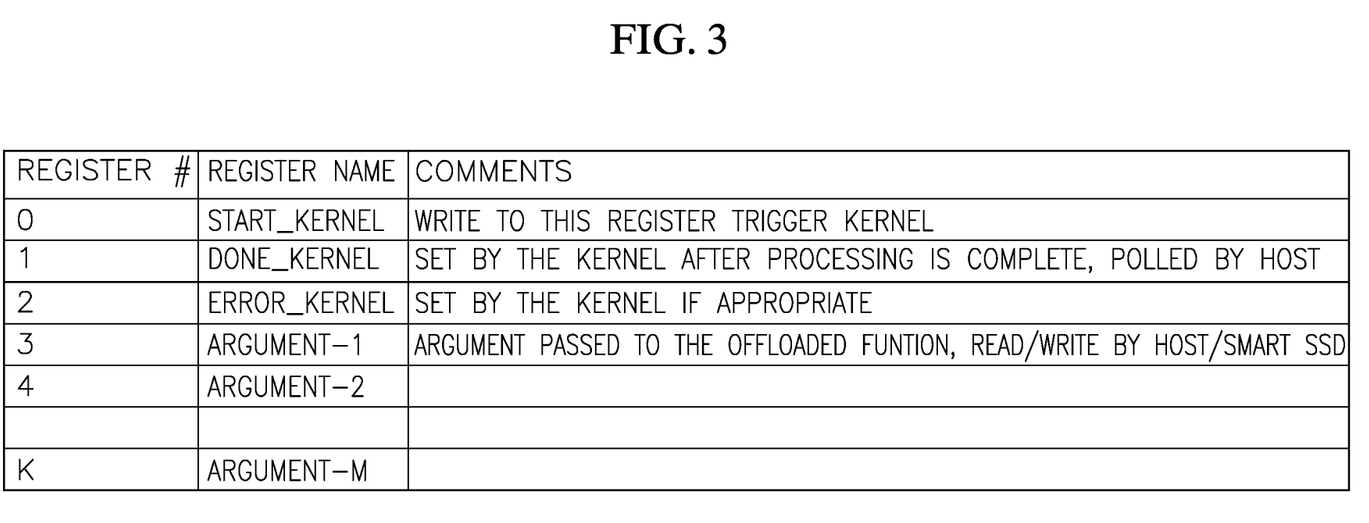
FIG. 3 illustrates an example of a register interface presented by the bridge kernel to the host.
Figure 4:
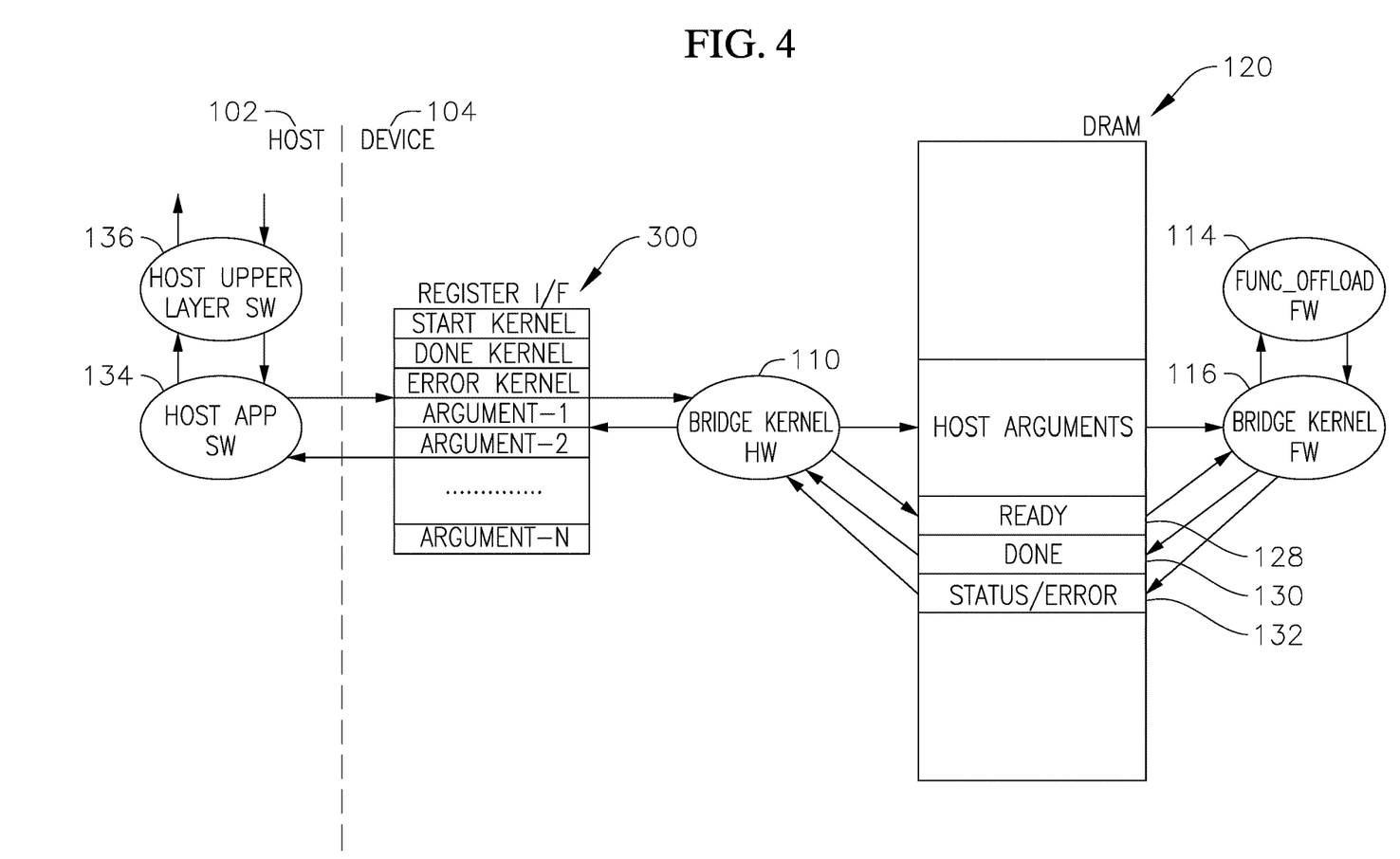
FIG. 4 illustrates an example of the layout of a handshake region as shown in FIG. 1A.

FIGS. 2A-2B illustrate an example flow of a host application (e.g., the user application(s) 106) interfacing with offloaded kernels. At 201, the bridge kernel (e.g., bridge kernel driver) may receive a call or invocation from an upper layer (e.g., host upper layer software 136, as shown in FIG. 4). At 202, the bridge kernel (e.g., bridge kernel driver) can store the host arguments (e.g., Arguments-1, ..., Argument-n) into the host register interface (e.g., 300 of FIG. 3). At 203, the bridge kernel (e.g., bridge kernel driver) can allocate buffers (e.g., data buffers 122) for data processing. At 204, the bridge kernel (e.g., bridge kernel driver) can initialize other arguments needed by the offloaded application function(s) 114. At 205, the bridge kernel (e.g., bridge kernel driver) can fetch data into the buffers for processing. At 206, the bridge kernel (e.g., bridge kernel driver) can invoke the processing kernel. Once the data processing is finished, at 207, the system 100 can perform clean-up operation. At 208, the offloaded application function(s) 114, through the bridge kernel (e.g., bridge kernel driver), may return the call to the upper layer application software.

In some embodiments, the bridge kernel can provide a generic register interface to the host 102. FIG. 3 illustrates an example of a register interface 300 presented by the bridge kernel to the host 102. The register interface 300 may be located in the storage device 104. The system 100 can present the kernels to the host application (e.g., running in the user application(s) 106) using register interface 300 (e.g., as shown in FIG. 3) to pass arguments to the offloaded functions (e.g., offloaded application function(s) 114) and retrieve the returned values or status. In some embodiments, the system 100 can use the OpenCL 108 platform to facilitate buffer allocation for the kernels.

FIG. 4 illustrates an example of the layout of the handshake region 124 of the DRAM 120 of FIG. 1A. As illustrated in FIG. 4, in some embodiments, the bridge kernel hardware 110 can temporarily store the arguments (e.g., Arguments-1, . . . , Argument-n) received from the host 102 into a set or predetermined memory location in the DRAM 120 of the storage device 104 (e.g., smart SSD). In some embodiments, the on-chip FIFO 118 structure can be used to pass arguments to the embedded processor 112 incorporating the offloaded application function(s) 114 firmware and the bridge kernel firmware 116, instead of the DRAM 120.

The contents of the register interface 300, for example, Argument-1 through Argument-n can temporarily be stored into the handshake region 124 of the DRAM 120. Once the arguments are temporarily stored in the DRAM 120, the bridge kernel hardware 110 can set a "ready" 128 flag in the handshake region 124 of the DRAM 120. At that point, the bridge kernel hardware 110 can wait for the offload functions running on the firmware (e.g., bridge kernel firmware 116) to complete processing. Accordingly, to determine the completion of offload function processing, the bridge kernel hardware 110 may poll for a "done" 130 flag in the handshake region 124 of the DRAM 120.

Once the bridge kernel hardware 110 detects the "done" 130 flag, the bridge kernel hardware 110 may read any error or other status from the handshake region 124 of the DRAM 120. The bridge kernel hardware 110 updates that error and/or other status 132 into corresponding registers of the register interface 300 (as shown in FIG. 3). The bridge kernel hardware 110 may then set the "done" 130 register, which can in turn be polled by the host bridge kernel driver software 134 to indicate completion of the offload function call.

Figure 5:
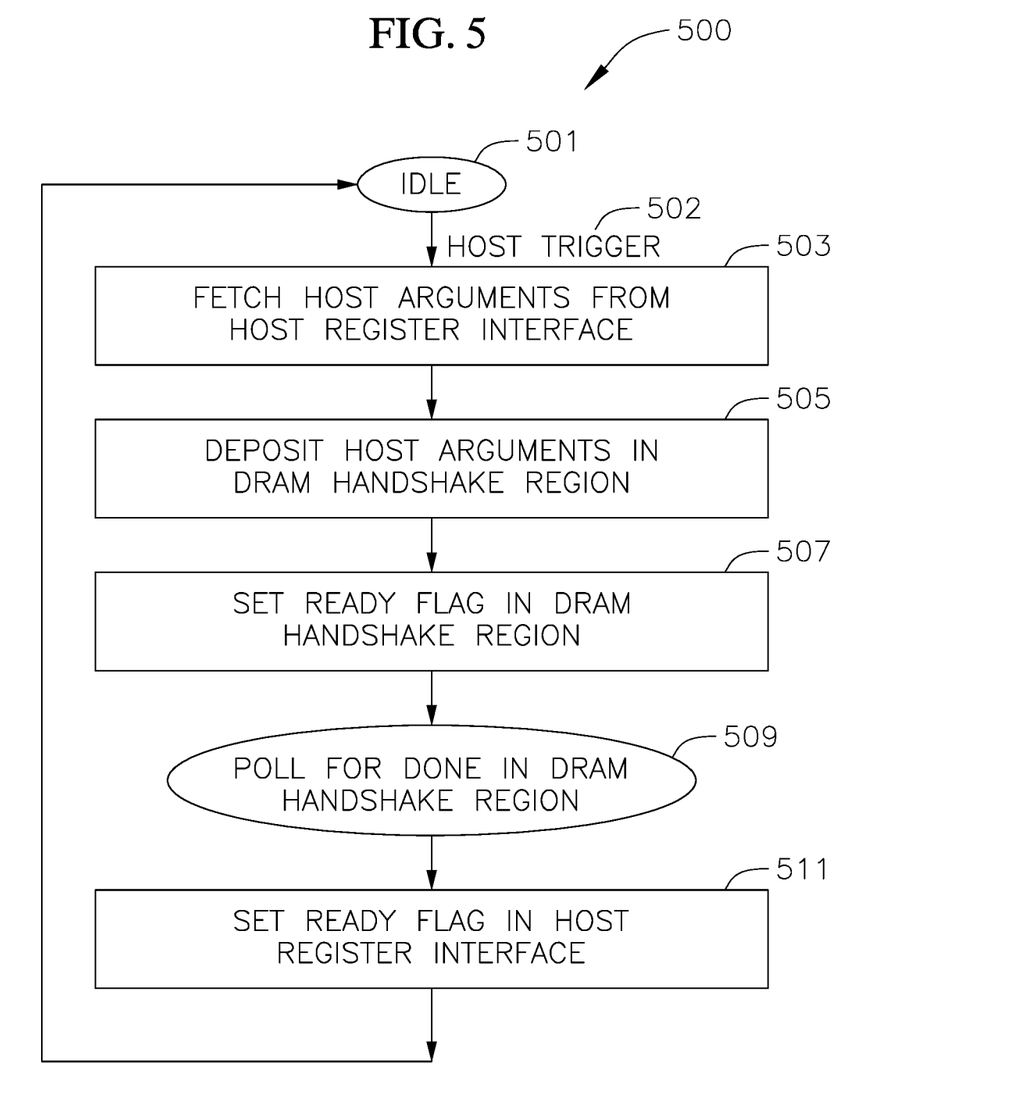
FIG. 5 illustrates a method of using the bridge kernel hardware as a state machine.

FIG. 5 illustrates a method 500 of using the bridge kernel hardware as a state machine. The bridge kernel hardware may be the bridge kernel hardware 110 of FIG. 1A.

At 501, the bridge kernel hardware 110 remains in an idle state. At 501, the bridge kernel hardware 110 receives a trigger from the host 102. At 503, the bridge kernel hardware 110 fetches the arguments (e.g., Arguments-1, . . . , Argument-n) received from the host 102 from a host register interface (e.g., 300 of FIG. 3). At 505, the bridge kernel hardware 110 temporarily stores the arguments (e.g., Arguments-1, . . . , Argument-n) received from the host 102 in the handshake region 124 of the DRAM 120. Once the arguments are temporarily stored in the DRAM 120, at 507, the bridge kernel hardware 110 sets a "ready" 128 flag in the handshake region 124 of the DRAM 120.

At that point, the bridge kernel hardware 110 waits for the offload functions in the firmware (e.g., bridge kernel firmware 116) to complete its processing based on the arguments. For that purpose, at 509, the bridge kernel hardware 110 polls a "done" 130 flag in the handshake region 124 of the DRAM 120. In some embodiments, once the bridge kernel hardware 110 detects the "done" 130 flag, the bridge kernel hardware 110 may read any error or other status from the handshake region 124 of the DRAM 120. The bridge kernel hardware 110 updates that error and/or other status 132 into the appropriate registers of the register interface 300 (as shown in FIG. 3). The bridge kernel hardware 110 then sets the "done" 130 register which is in turn polled by the host software 134 to indicate completion of the offload function call.

At 511, the bridge kernel hardware 110 sets the ready flag in the host register interface (e.g., 300 of FIG. 3). After 511, the bridge kernel hardware 110 returns to 501.

Figure 6:
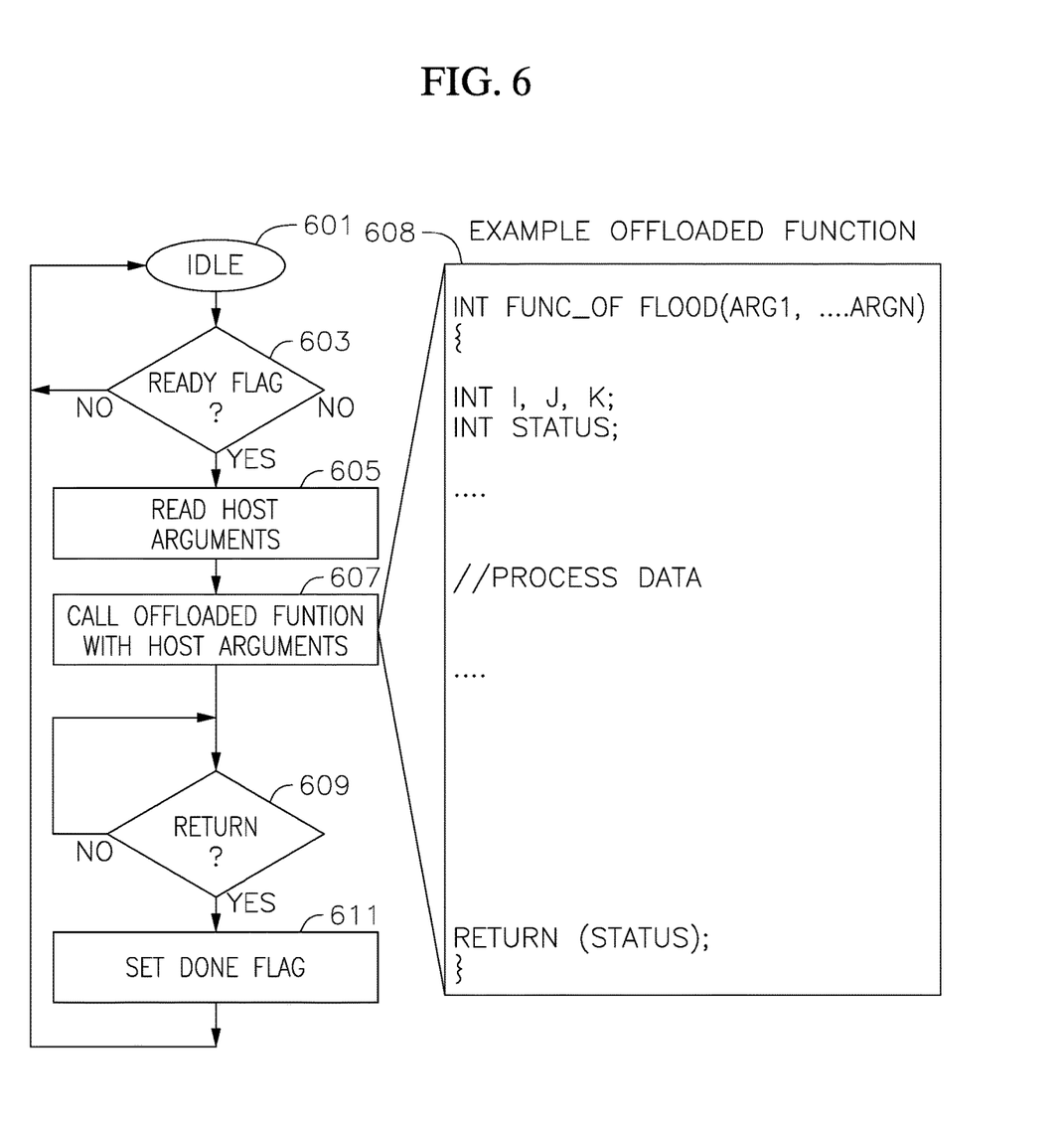
FIG. 6 illustrates the bridge kernel firmware operation.

FIG. 6 illustrates the bridge kernel firmware operation. The bridge kernel firmware may be the bridge kernel firmware 116 of FIG. 1A.

At 601, the bridge kernel firmware 116 remains in an idle state. At 603, the "ready" flag 128 in the DRAM 120 is polled by the bridge kernel firmware 116 running on the embedded processor 112. In other words, the bridge kernel firmware 116 acts as an offload manager that invokes the offloaded functions (e.g., offloaded application function(s) 114) with appropriate arguments. When the bridge kernel firmware 116 detects the "ready" flag is set, at 605, the bridge kernel firmware 116 fetches the arguments (e.g., Arguments-1, . . . , Argument-n) temporarily stored in the DRAM 120 handshake region 124. At 607, the bridge kernel firmware 116 calls the offloaded application function(s) 114 with host 102 arguments. The offloaded application function(s) 114 uses the arguments (e.g., Arguments-1, . . . , Argument-n) and performs the data processing functions as designed. An example of the offloaded application function(s) 114 is shown at 608. Once the data processing is finished, at 609, the offloaded application function(s) 114 returns the call to the bridge kernel firmware 116. At 611, the bridge kernel firmware 116 sets a "done" flag in the handshake region 124 in the DRAM 120. The "done" flag is in turn polled by the bridge kernel hardware 110, as described earlier, so as to send the completion back to the host 102. After 611, the bridge kernel firmware 116 returns to 601.

In some embodiments, the bridge kernel acts as a proxy to host applications (e.g., running in the user application(s) 106). For example, the host application (e.g., running in the user application(s) 106) is agnostic to where or how the offloaded function is implemented. In some embodiments, the kernel implementation can be transparent to the host 102. In some embodiments, kernels can be implemented on an embedded processor (e.g., embedded processor 112) as software kernels. In some embodiments, however, the kernels can be implemented in hardware gates (e.g., bridge kernel hardware 110).

In some embodiments, the bridge kernel itself can be agnostic to the offloaded functions (e.g., offloaded application function(s) 114), which may enable user confidentiality (e.g., IP address confidentiality). Therefore, the users can create their own offloaded functions as software kernels or hardware kernels, without revealing to the storage device users. That is to say that the example embodiment of the bridge kernel mechanism can work as a platform that can be used by the users to offload their private acceleration functions to the storage device. In some embodiments, host interface to kernels and/or offloaded functions may not change (e.g., kernels can be upgraded to high performance versions without significant host-side changes). In such a case, the bridge kernel (e.g., the bridge kernel hardware 110) RTL can provide a standard or an agreed-upon interface to the host applications (e.g., user application(s) 106).

In some embodiments, the bridge kernel (e.g., the bridge kernel hardware 110) can use FPGA DRAM (e.g., DRAM 120) memory to perform handshake with the bridge kernel firmware 116. In other embodiments, the bridge kernel hardware 110) can use on-chip FIFO (e.g., FIFO 118) to perform handshake with the bridge kernel firmware 116. In some embodiments, the bridge kernel (e.g., the bridge kernel hardware 110) RTL can use the FPGA DRAM (e.g., DRAM 120) to pass arguments to the offloaded functions running on the embedded processor 112.

In some embodiments, the bridge kernel (e.g., the bridge kernel hardware 110) can be agnostic with regard to an underlying transport mechanism (for example, PCIe, Ethernet and the like), which is used to establish a connection between the host 102 and the storage device 104. In some embodiments, the system 100, including the bridge kernel (e.g., the bridge kernel hardware 110), may provide relatively quick user engagement by providing a relatively fast porting or development option as compared with the systems without a bridge kernel, increased reuse of the existing code base by the users, and can enable the system to perform other activities while high-performance kernels are being developed. In some embodiments, the system 100, including the bridge kernel (e.g., the bridge kernel hardware 110), may also provide system integration, qualification, testing, demos, and the like.

In some embodiments, the bridge kernel can use arguments passed by host (and/or set by the device) to decide which offloaded function (e.g., kernel) to invoke. In some embodiments, the bridge kernel can invoke a soft kernel, a hard kernel, or one or more kernels of various performance levels. In some embodiments, the bridge kernel can use a cost function to select a particular kernel based on the arguments. In some embodiments, the kernel selection is based on configuration parameters, such as, application type, application identifier, Namespace identifier, host identifier, LBA address ranges, NVM set identifier, NVMe submission queue identifier, completion queue identifier, Stream Identifier, Ethernet MAC Identifier, TCP/IP addresses and other transport/network parameters, and general parameters like date, and time, etc.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

In some embodiments, one or more outputs of the different embodiments of the methods and systems of the present disclosure may be transmitted to an electronics device coupled to or having a display device for displaying the one or more outputs or information regarding the one or more outputs of the different embodiments of the methods and systems of the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Although exemplary embodiments of a system and a method for offloading application functions to a device have been specifically described and illustrated herein, many modifications and variations will be apparent to those skilled in the art. Accordingly, it is to be understood that to a system and a method for offloading application functions to a device constructed according to principles of this disclosure may be embodied other than as specifically described herein. The inventive concept is also defined in the following claims, and equivalents thereof.

What is claimed is:

1. A system comprising:
a host device; and
a storage device comprising:
a processor;
a dynamic random-access memory (DRAM), the DRAM comprising one or more data buffers and a handshake region to store arguments received from the host device; and
a bridge device, the bridge device being configured to:
fetch arguments from a host register interface of the host device;
initiate execution, at the processor, of a kernel at the processor based on the arguments, the kernel being selected from a plurality of kernels available in the processor based on determining that a performance metric of the kernel satisfies a threshold and based on a cost function determined based on the arguments and storage or networking parameters received from the host device; transfer the arguments received from the host device to the kernel for data processing;
fetch new arguments in the handshake region of the DRAM; and
call the kernel in the processor with the new arguments for data processing,
wherein the kernel is configured to return the call to the bridge device based on completion of the data processing; and
wherein a done flag is polled in the DRAM based on the completion of the data processing.

2. The system of claim 1, wherein:
the kernel of the bridge device comprises hardware kernels and firmware kernels configured to run on the processor;
an implementation of the bridge device is transparent to the host device;
the bridge device is agnostic to a transport mechanism between the host device and the bridge device; and
the transport mechanism is one of a peripheral component interconnect express (PCIe) or an Ethernet connection.

3. The system of claim 2, wherein the storage device is a solid state drive (SSD), and the processor is a field programmable gate array (FPGA) processor or a SSD controller or a discrete co-processor, wherein:
the processor further comprises the firmware kernels of the bridge device.

4. The system of claim 3, wherein the storage device further comprises a first in, first out (FIFO) register, wherein the FIFO register and the DRAM are communicatively coupled to the hardware kernels of the bridge device.

5. The system of claim 4, wherein the FIFO register is configured to pass the arguments to the processor incorporating the kernels for data processing.

6. The system of claim 4, wherein the hardware kernels of the bridge device are configured to store the arguments received from the host device into the handshake region of the DRAM.

7. The system of claim 4, wherein the bridge device is configured to act as a proxy to host applications running on a customer applications module of the host device, wherein the host applications are agnostic to a location and a method of implementation of the kernels.

8. The system of claim 4, wherein the host device comprises a customer applications module and a computing module, and wherein the host device is configured to establish the PCIe or the Ethernet connection with the storage device.

9. The system of claim 8, wherein host applications running on the customer applications module of the host device are configured to interface with the firmware kernels and/or the hardware kernels through the computing module.

10. The system of claim 9, wherein the bridge device is configured to select one or more kernels from among the hardware kernels and the firmware kernels for data processing based on cost functions determined based on the arguments and the storage or networking parameters received from the host device.

11. The system of claim 10, wherein the storage or networking parameters received from the host device comprise at least one of a Submission Queue Identifier (SQID), a Completion Queue Identifier (CQID), a Stream ID, a host ID, a Logical Block Address (LBA) range, a Network Service ID (NSID), a Media Access Control (MAC) ID, Transmission Control Protocol (TCP)/Internet Protocol (IP) fields, an application type, an application identifier, or a time and a date associated with the host device.

12. The system of claim 11, wherein the bridge device is configured to select the one or more kernels for data processing using the FIFO register.

13. The system of claim 12, wherein the firmware kernels of the bridge device are configured to fetch the arguments in the handshake region of the DRAM and call the kernels with the arguments received from the host device.

14. The system of claim 13, wherein the kernels are configured to use the arguments for data processing.

15. A method comprising:
fetching from a host register interface of a host device connected to a storage device, by a bridge device of the storage device, arguments received from the host device in response to receiving a trigger from the host device;
setting, by the bridge device, a ready flag in a dynamic random-access memory (DRAM) of the storage device;
polling, by the bridge device, a done flag in the DRAM, based on the bridge device determining that processing of a kernel in a processor of the storage device based on the arguments is completed, the kernel being selected from a plurality of kernels available in the processor based on determining that a performance metric of the kernel satisfies a threshold and based on a cost function determined based on the arguments and storage or networking parameters received from the host device;

setting, by the bridge device, a ready flag in the host register interface;

reading, by the bridge device, error or status from the DRAM based on detecting the done flag in the DRAM; and updating, by the bridge device, an error or a status into the host register interface.

16. The method of claim 15, further comprising:

storing, by the bridge device, the arguments in a handshake region of the DRAM, wherein the ready flag is set in the handshake region of the DRAM; and wherein the done flag is polled in the handshake region of the DRAM.

17. The method of claim 16, further comprising:

polling, by firmware of the bridge device, the ready flag in the DRAM, wherein the bridge device is configured to select the kernel from among the plurality of kernels further based on cost functions of two or more kernels determined based on the arguments received from the host device, fetching, by the firmware of the bridge device, new arguments in the handshake region of the DRAM;

calling, by the firmware of the bridge device, the kernel in the processor of the storage device with the new arguments for data processing;

returning the call, by the kernel, to the firmware of the bridge device based on completion of the data processing; and setting, by the firmware of the bridge device, the done flag in the handshake region of the DRAM.

18. A system comprising a storage device comprising:
a processor;
a dynamic random-access memory (DRAM), the DRAM comprising one or more data buffers and a handshake region to store arguments received from a host device connected to the storage device; and
a bridge device configured to: 2024 receive one or more arguments from the host device;
initiate execution, at the processor, of a kernel at the processor based on the arguments, the kernel being selected from a plurality of kernels available in the processor based on determining that a performance metric of the kernel satisfies a threshold and based on a cost function determined based on the arguments and storage or networking parameters received from the host device; transfer the arguments received from the host device to the kernel for data processing;
fetch new arguments in the handshake region of the DRAM; and
call the kernel in the processor with the new arguments for data processing,
wherein the kernel is configured to return the call to the bridge device based on completion of the data processing,
wherein a done flag is polled in the DRAM based on the completion of the data processing, and
wherein the bridge device fetches the arguments received from the host device from a host register interface.

19. The system of claim 18, wherein the kernel of the bridge device comprises a hardware kernels and a firmware kernels,
wherein the storage device is a solid state drive (SSD), and the processor is a field programmable gate array (FPGA) processor or a SSD controller or a discrete co-processor, and
wherein the processor further comprises the firmware kernels of the bridge device.

20. The system of claim 19, wherein the storage device further comprises a first in first out (FIFO) register, wherein the FIFO register and the DRAM are communicatively coupled to the hardware kernels of the bridge device,
wherein the firmware kernels of the bridge device are configured to run in the processor,
wherein the bridge device is configured to select one or more kernels from among the hardware kernels and the firmware kernels for data processing based on cost functions determined based on the arguments and the storage or networking parameters received from the host device,
wherein the storage or networking parameters received from the host device are one or more of a Submission Queue Identifier (SQID), a Completion Queue Identifier (CQID), a Stream ID, a host ID, a Logical Block Address (LBA) range, a Network Service ID (NSID), a Media Access Control (MAC) ID, Transmission Control Protocol (TCP)/Internet Protocol (IP) fields, an application type, an application identifier, or a time and a date associated with the host device, and
wherein the bridge device is configured to select the one or more kernels from among the hardware kernels and the firmware kernels for data processing using the FIFO register.

* * * * *